United States Patent
Ng

(10) Patent No.: US 9,077,503 B2
(45) Date of Patent: Jul. 7, 2015

(54) CHANNEL QUALITY INDICATOR METHOD

(75) Inventor: Boon Loong Ng, Victoria (AU)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 291 days.

(21) Appl. No.: 13/257,462

(22) PCT Filed: Mar. 17, 2010

(86) PCT No.: PCT/JP2010/055144
§ 371 (c)(1),
(2), (4) Date: Sep. 19, 2011

(87) PCT Pub. No.: WO2010/107129
PCT Pub. Date: Sep. 23, 2010

(65) Prior Publication Data
US 2012/0008522 A1    Jan. 12, 2012

(30) Foreign Application Priority Data

Mar. 19, 2009 (AU) ................................ 2009901196

(51) Int. Cl.
| | | |
|---|---|---|
| *H04W 24/10* | (2009.01) | |
| *H04L 5/00* | (2006.01) | |
| *H04L 1/00* | (2006.01) | |
| *H04J 3/16* | (2006.01) | |
| *H04L 5/14* | (2006.01) | |
| *H04W 16/14* | (2009.01) | |

(52) U.S. Cl.
CPC ............ *H04L 5/0057* (2013.01); *H04L 1/0026* (2013.01); *H04L 1/0028* (2013.01); *H04L 5/0016* (2013.01); *H04L 5/0035* (2013.01); *H04L 5/0048* (2013.01); *H04L 5/0053* (2013.01); *H04W 16/14* (2013.01); *H04W 24/10* (2013.01); *H04J 3/1694* (2013.01); *H04L 5/14* (2013.01)

(58) Field of Classification Search
CPC ............................ H04L 1/0026; H04L 5/0057
USPC ......... 370/328, 235, 252, 280, 281, 311, 329; 375/228, 267
See application file for complete search history.

(56) References Cited

U.S. PATENT DOCUMENTS

| | | | |
|---|---|---|---|
| 8,149,749 B2 * | 4/2012 | Maeda et al. ................. | 370/311 |
| 8,259,657 B2 | 9/2012 | Inoue et al. | |

(Continued)

FOREIGN PATENT DOCUMENTS

| | | | | |
|---|---|---|---|---|
| CN | 101369843 | | 2/2009 | |
| JP | WO 2007/145035 | * | 4/2007 | ............... H04B 7/26 |

OTHER PUBLICATIONS

Motorola, "Common Reference Symbol Mapping/Signaling for 8 Transmit Antennas", 3GPP TSG RAN1 #54, R1-083224, published before Aug. 2, 2008.*

(Continued)

*Primary Examiner* — Khaled Kassim
*Assistant Examiner* — Zhaohui Yang

(57) ABSTRACT

The disclosed a method will work with future versions of LTE-A, be backwards compatible, and alleviate interference to signals for basic system operation. The method includes generating one or more Reference Signals associated with the one or more Channel Quality Indicators, and includes mapping the one or more Channel Quality Indicator-Reference Signals to the last symbol of the second slot of the one or more subframes.

20 Claims, 9 Drawing Sheets

(56) References Cited

U.S. PATENT DOCUMENTS

| | | | |
|---|---|---|---|
| 8,379,507 | B2 | 2/2013 | Bertrand et al. |
| 2006/0009227 | A1* | 1/2006 | Cudak et al. .................. 455/450 |
| 2008/0267165 | A1* | 10/2008 | Bertrand et al. ............. 370/350 |
| 2009/0046570 | A1 | 2/2009 | Sarkar et al. |
| 2009/0154588 | A1* | 6/2009 | Chen et al. .................... 375/267 |
| 2009/0238256 | A1* | 9/2009 | Onggosanusi et al. ....... 375/228 |
| 2010/0046412 | A1* | 2/2010 | Varadarajan et al. ......... 370/312 |
| 2010/0091893 | A1 | 4/2010 | Gorokhov |
| 2010/0118989 | A1* | 5/2010 | Sayana et al. ................. 375/260 |
| 2010/0195566 | A1 | 8/2010 | Krishnamurthy et al. |
| 2010/0322100 | A1 | 12/2010 | Wan et al. |
| 2011/0159901 | A1* | 6/2011 | Frenger et al. ................ 455/502 |
| 2011/0293037 | A1 | 12/2011 | Liu et al. |

OTHER PUBLICATIONS

ZTE, "Discussion of CQI-RS design for LTE-A CoMP", 3GPP TSG RAN WG1 #56, R1-090632, published before Feb. 13, 2009.*
Machine English translatoin of WO 2007/145035.*
3GPP TS36.211 V8.5.0, 3GPP, Dec. 2008.
3GPP TS36.213 V8.5.0, 3GPP, Dec. 2008.
3GPP R1-091221, 3GPP, Mar. 23, 2009.
3GPP R1-091066, 3GPP, Feb. 9, 2009.
International Search Report, PCT/JP2010/055144, Apr. 27, 2010.
Extended European Search Report dated Dec. 21, 2012 in corresponding European Application No. 12182932.9.
Qualcomm Europe: "Impact of Downlink CoMP on the Air Interface", 3GPP Draft; R1-090366, 3rd Generation Partnership Project (3GPP), Mobile Competence Centre; 650, Route Des Lucioles; F-06921 Sophia-Antipolis Cedex; France, no. Ljubljana; 20090108, Jan. 8, 2009, XP050318270.
Korean Official Action—10-2011-7024554—Aug. 10, 2012.
Huawei, "DL Coordinated Beam Switching for Interference management in LTE-Advanced," 3GPP TSG RAN WG1#54bis, R1-083710 (Sep. 29-Oct. 3, 2008).
CN Office Action dated Jul. 31, 2013, with English translation; Application No. 201080012550.5.
Office Action dated Jun. 7, 2013 in U.S. Appl. No. 13/590,695.
US Office Action dated Nov. 21, 2013; U.S. Appl. No. 13/590,695.
NTT DOCOMO, DL RS Design for LTE-Advanced, 3GPP TSG RAN WG1 Meeting #56bis R1-091483, pp. 1-7, Mar. 23-27, 2009.
Nokia, Nokia Siemens Networks, CSI-RS design for LTE-Advanced downlink, 3GPP TSG RAN WG1 Meeting #56-bis R1-091351, pp. 1-8, Mar. 23-27, 2009.
Samsung, DL RS Designs for Higher Order MIMO, 3GPP TSG RAN WG1 #56 R1-090619, pp. 1-7, Feb. 9-13, 2009.
TD Tech, Dedicated RS design w/wo overhead reduction, 3GPP TSG RAN WG1#52bis R1-081338, pp. 1-3, Mar. 4, 2008.
Japanese Official Action—2013-208237—May 27, 2014.
Chinese Office Action, dated Oct. 11, 2014, in corresponding Chinese Patent Application No. 201080012550.5.
3GPP TSG RAN WG1 Meeting#49bis R1-072930;CATT;Downlink Dedicated Reference Symbols Structure for TDD with Frame Structure Type 2; Body Section 1, Figure 2.

* cited by examiner

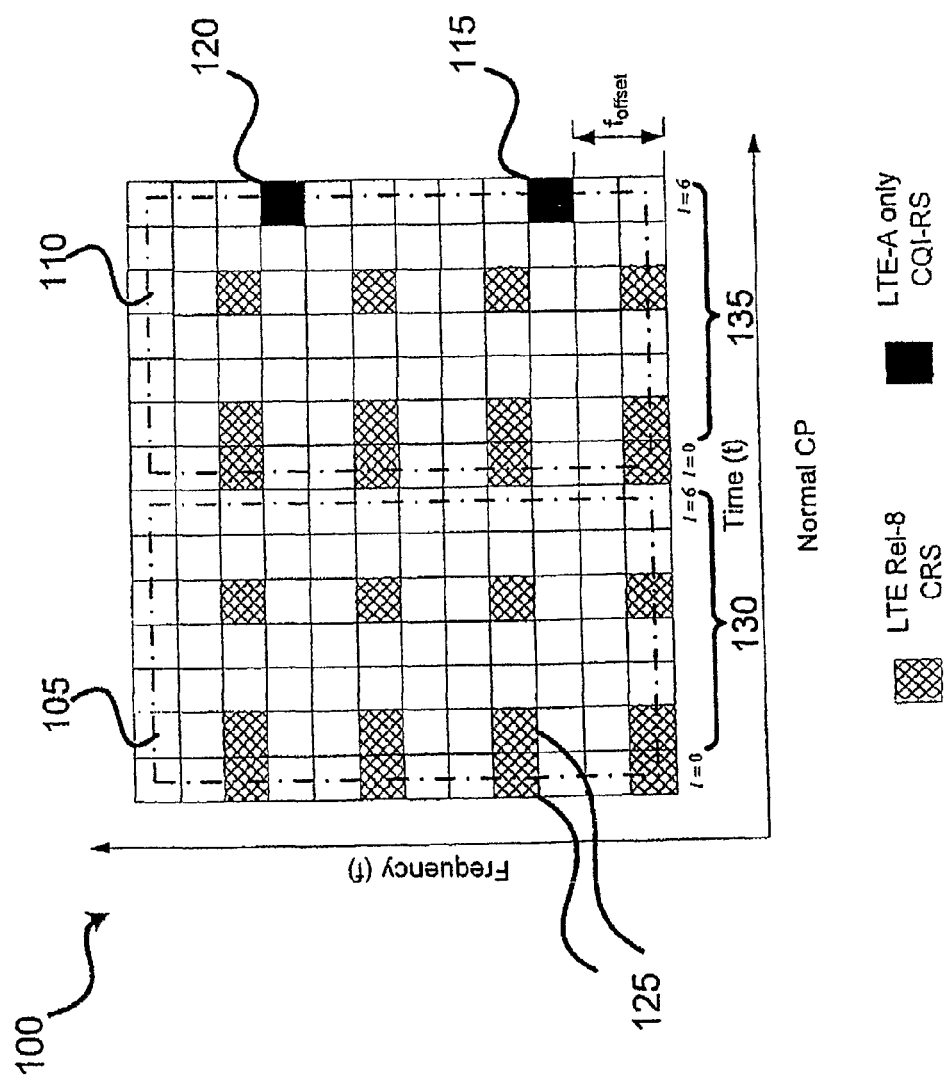

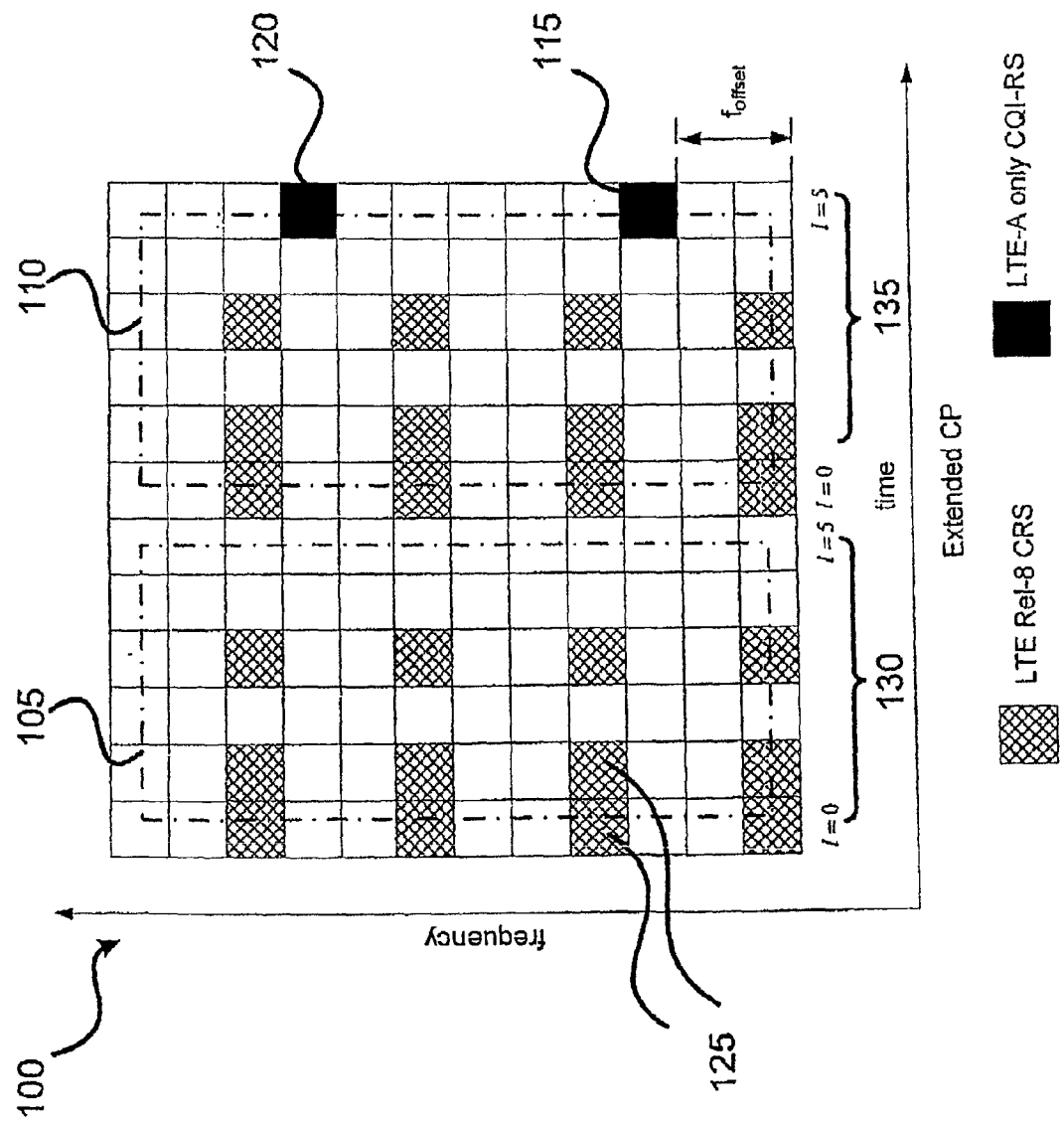

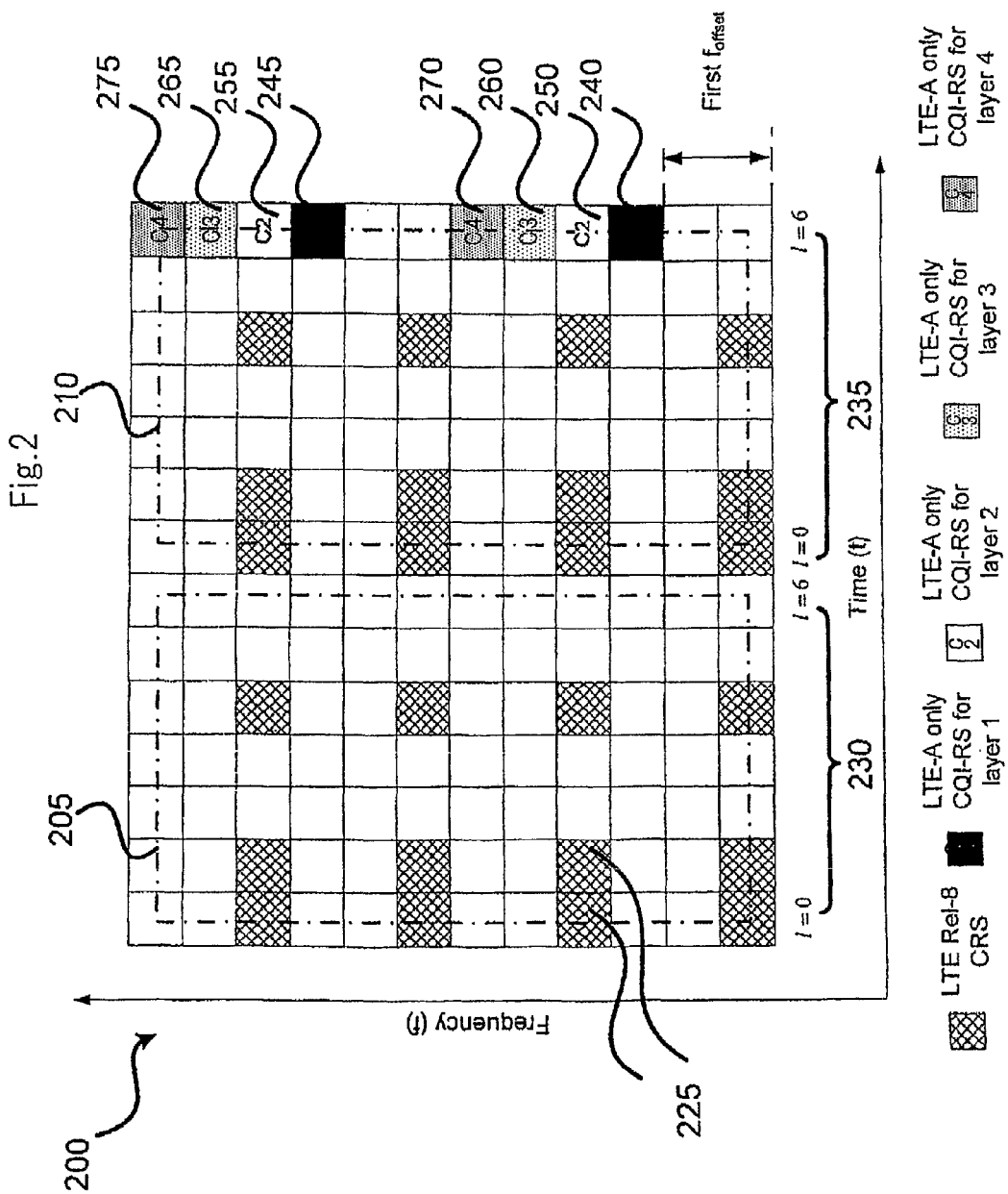

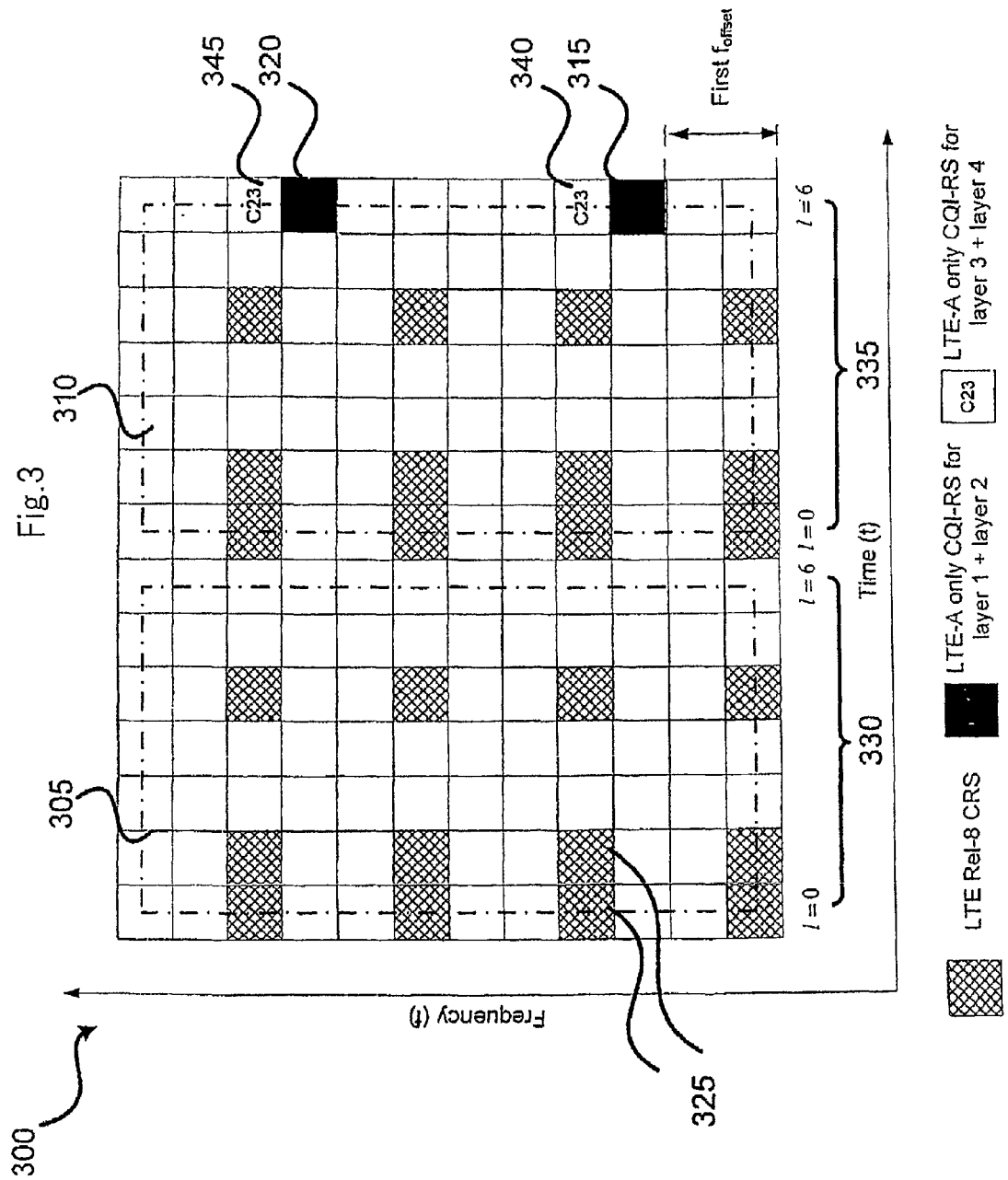

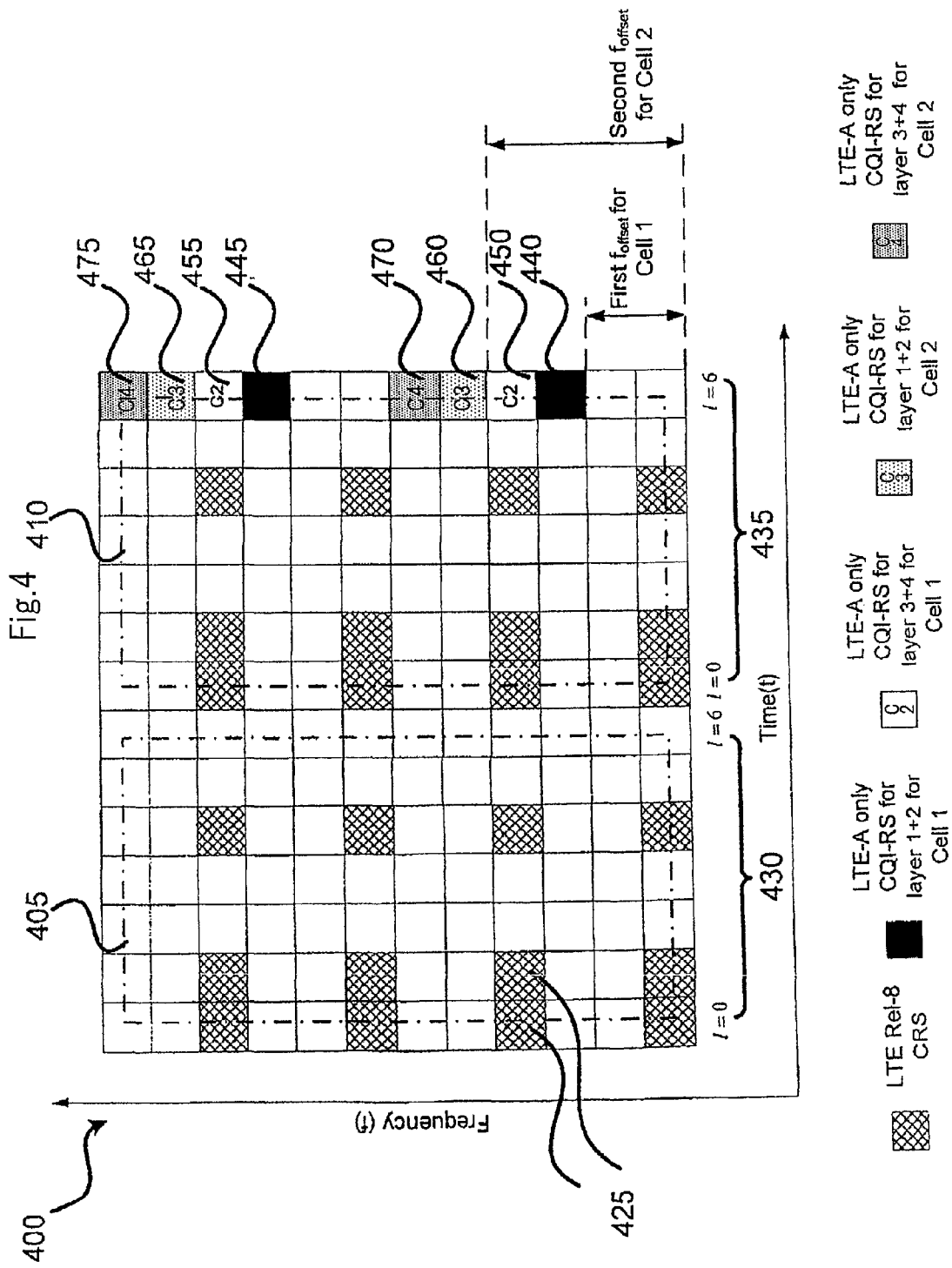

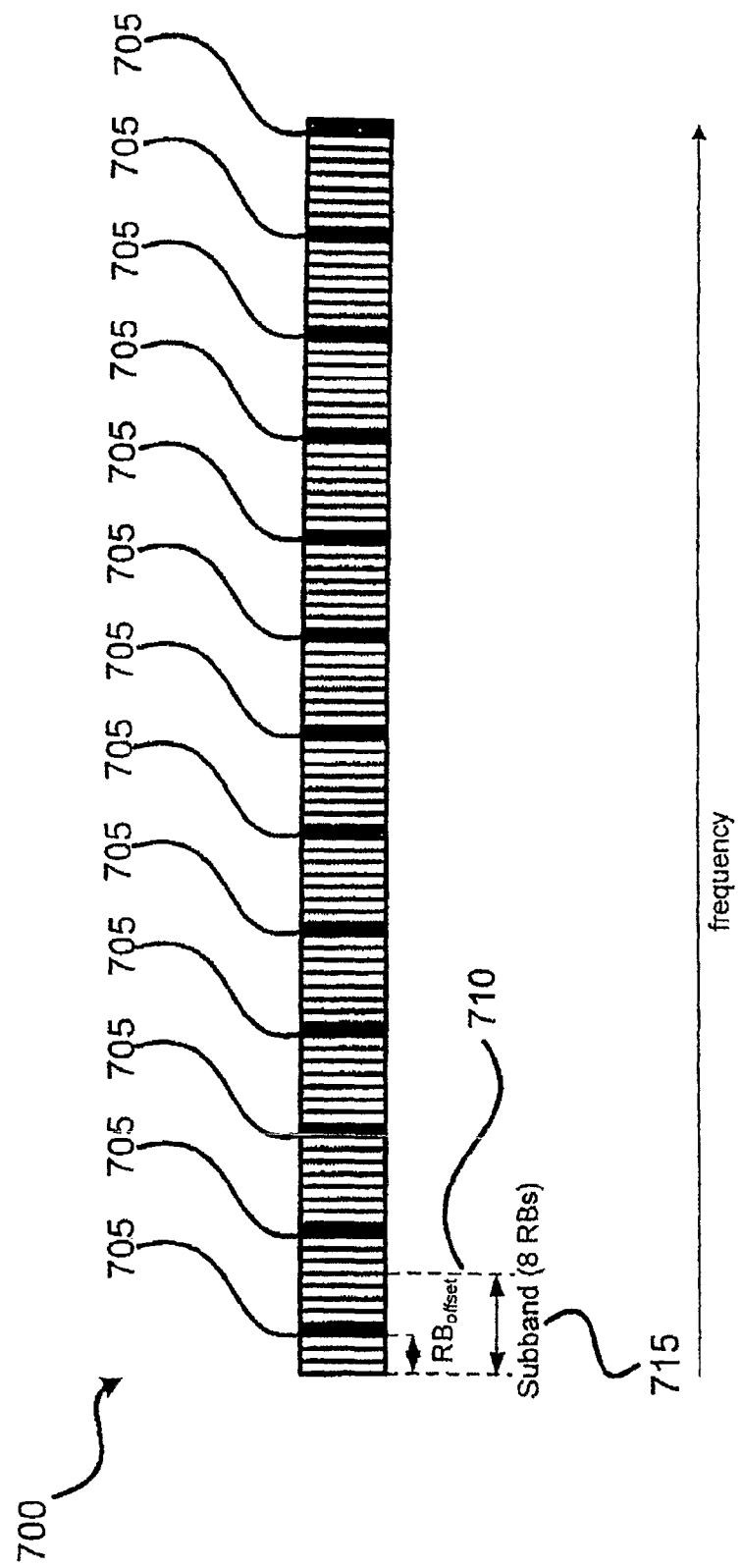

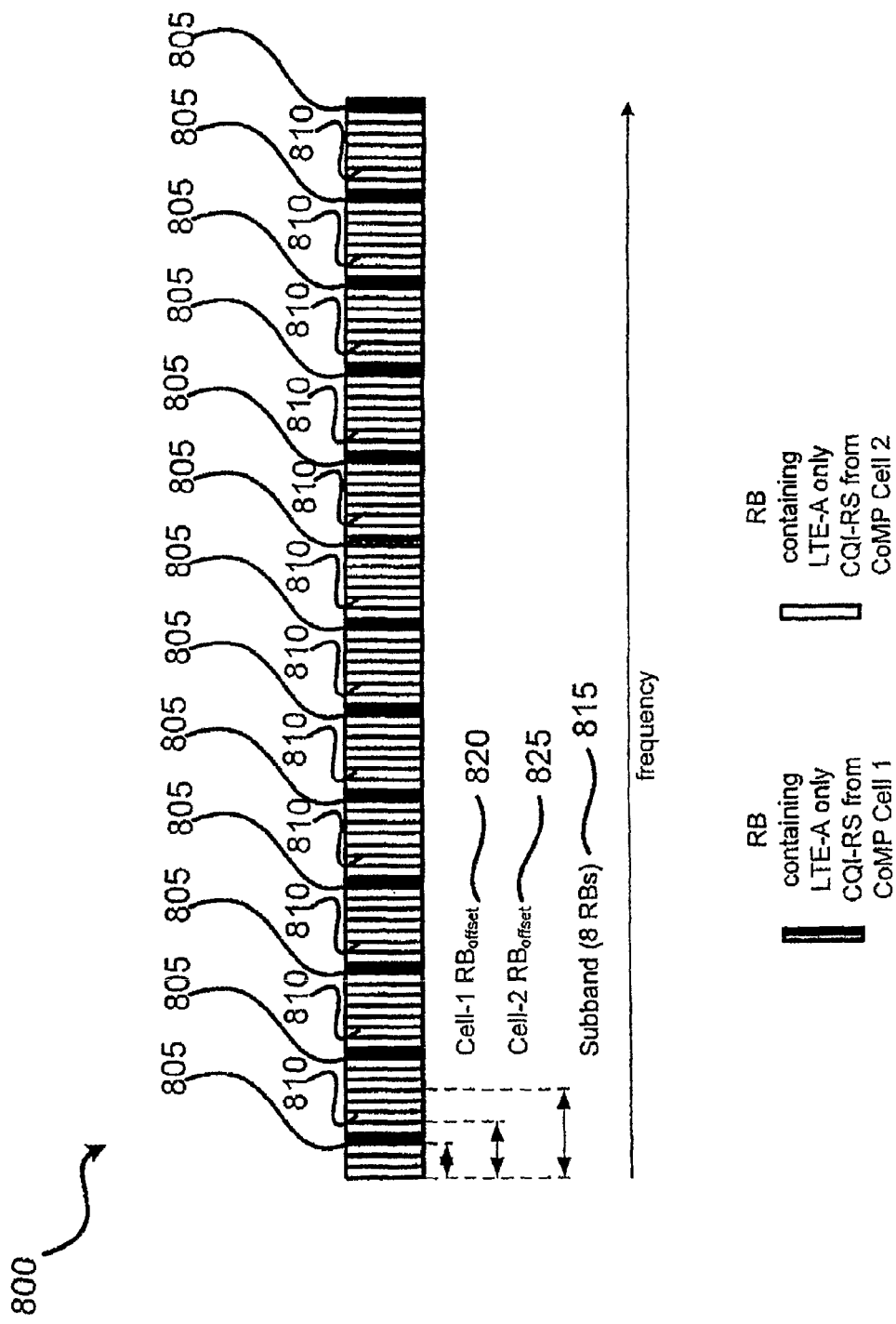

US 9,077,503 B2

CHANNEL QUALITY INDICATOR METHOD

TECHNICAL FIELD

The present invention relates to wireless communications systems, and more particularly to a method for determining and transmitting Channel Quality Indicator Reference Signals (CQI-RS) from one or more subframes such that an associated User Equipment (UE) can use the CQI-RS to measure CQI.

BACKGROUND ART

In advanced mobile communication systems, such as the Long-Term-Evolution (LTE) system and the Long-Term-Evolution Advanced (LTE-A) system, User Equipment (UE) is utilised to measure and to report a number of parameters in the communication system including Rank Indicator (RI), Channel Quality Indicator (CQI) or Precoding Matrix Indicator (PMI) to the evolved Node B (eNB) thereby enabling support of resource allocation, link adaptation and spatial multiplexing transmission.

Currently, LTE (Release-8) RI, CQI/PMI measurement is performed based on the cell-specific reference signals (CRS). Each CRS is associated with transmit antenna ports at the eNB (there is a maximum of 4 transmit antenna ports). Therefore, the maximum number of transmission layers that can be supported for spatial multiplexing is limited by the number of antenna ports available (i.e. 4).

It is envisaged that for LTE-A (Release-10), the number of antenna ports used for spatial multiplexing or the number of transmission layers should be up to 8. Therefore, more Reference Signals are needed to enable the support of higher-order MIMO transmission.

Further, a new technology under consideration for LTE-A is Coordinated Multi-Point (CoMP) transmission. The LTE-A UE may therefore also be required to measure and report the RI, CQI/PMI (or similar metric) for the Reference Signal transmitted from the eNBs that participate in CoMP transmission.

A problem with this increase in complexity is the possibility of interference to signals important for basic system operation together with backward compatibility issues on older UEs.

It would therefore be desirable to provide a method which will work with future versions of LTE-A, be backwards compatible and alleviate interference to signals for basic system operation.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

DISCLOSURE OF THE INVENTION

A improved channel quality indicator method for determining and transmitting one or more Channel Quality Indicator Reference Signals from one or more subframes such that an associated User Equipment can use the Channel Quality Indicator Reference Signals to measure Channel Quality Indicator, the subframes including first and second slots, each of the first and second slots including a plurality of symbols, and each of the first and second slots forming a resource block, wherein the method comprising:

generating one or more Reference Signals associated with the one or more Channel Quality Indicators;

mapping the one or more Channel Quality Indicator-Reference Signals to the last symbol of the second slot of the one or more subframes.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

BRIEF DESCRIPTION OF THE DRAWINGS

FIG. 1A is a schematic diagram of a subframe having two normal Cyclic Prefix (CP) resource blocks illustrating the location of the CQI-RS for one layer;

FIG. 1B is a schematic diagram of a subframe having two extended Cyclic Prefix (CP) resource blocks illustrating the location of the CQI-RS for one layer;

FIG. 2 is a schematic diagram of a subframe having two normal Cyclic Prefix (CP) resource blocks illustrating the location of the CQI-RS for multiple layers for multiplexing via (Frequency Division Multiplexing) FDM;

FIG. 3 is a schematic diagram of a subframe having two normal Cyclic Prefix (CP) resource blocks illustrating the location of the CQI-RS for multiple layers for multiplexing via hybrid FDM and (Code Division Multiplexing) CDM;

FIG. 4 is a schematic diagram of a subframe having two normal Cyclic Prefix (CP) resource blocks illustrating the location of the CQI-RS for multiple layers for CoMP cells multiplexed via hybrid FDM and CDM;

FIG. 7 is a schematic diagram of bandwidth of subframes illustrating the use of the resource block offset parameter $RB_{offset}$; and FIG. 8 is a schematic diagram of bandwidth of subframes illustrating the use of the resource block offset parameter $RB_{offset}$ suitable for CoMP cells.

CARRYING OUT THE INVENTION

Figure 5:
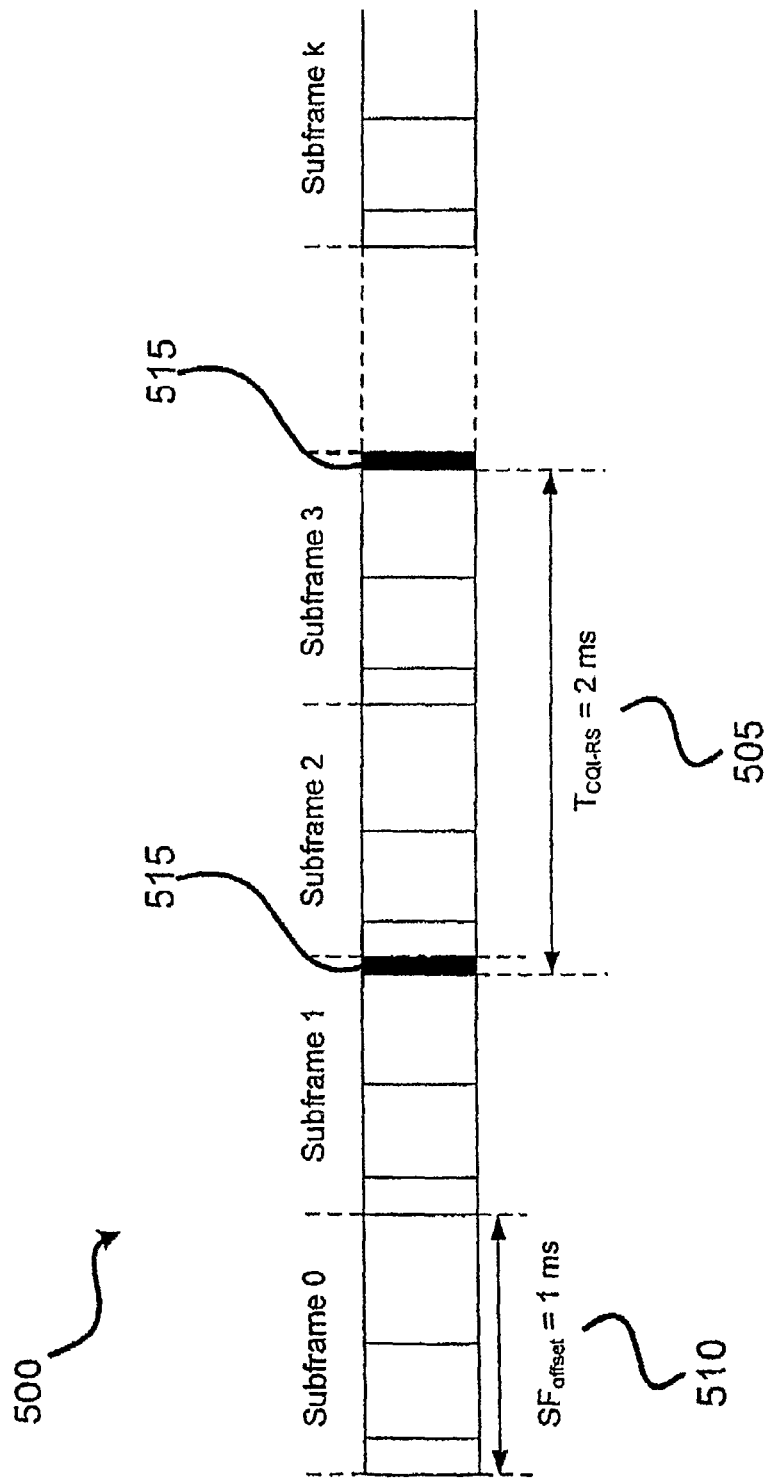
FIG. 5 is a schematic diagram of a series of subframes illustrating use of a cell-specific subframe offset.

Exemplary embodiments of the present invention are next described in detail with reference to the accompanying figures Referring now to FIG. 1A, there is shown a subframe 100 having two normal Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency W. Included in each of the slots 130, 135 are seven symbols along the time axis for a normal Cyclic Prefix resource block 105, 110. A number of resource elements which make up the overall resource block 105, 110 are cell-specific reference signals (CRS) 25 and first and second "Long Term Evolution—Advanced Channel Quality Indicator-Reference Signal" (LTE-A CQI-RS) 115, 120.

In operation, the CQI-RS of a layer is transmitted in last OFDM symbol (i.e. OFDM symbol number 6 in the second slot 135), in order to avoid collision with Rel-8 cell-specific reference signals (CRS), Rel-8 Dedicated Reference Signal (DRS), and Physical Broadcast CHannel (PBCH) and synchronisation signals. Preferably, there are two CQI-RS REs within a resource block 105, 110 and the CQI-RSs are uniformly distributed over the 12 subcarriers of the resource block. Providing two CQI-RS REs for each layer is advantageous since it has been found to provide a good balance between CQI-RS overhead and CQI measurement performance.

Also shown in FIG. 1A, is a first cell-specific subcarrier offset $f_{offset}$ for higher-layer configurations. First $f_{offset}$ determines the Resource Element (RE) location offset of the CQI-RS from the lowest subcarrier index in a resource block. This is shown in FIG. 1A for First $f_{offset}=2$. In the preferred case of two CQI-RS REs per resource block, First $f_{offset}$ can take value from 0-5.

FIG. 1B is identical to FIG. 1A but illustrates a subframe 100 which includes two extended Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Each of the slots 130, 135 are six symbols along the time axis for an extended Cyclic Prefix resource block 105, 110. In operation, the CQI-RS of a layer is transmitted in last OFDM symbol (i.e. OFDM symbol number 5 in the second slot 135).

Advantageously, by designing CQI-RS for all layers applicable to LTE-A operation to be placed in only one particular OFDM symbol within a subframe provides a simple way to avoid interference to/from Rel-8 CRS, Rel-8 DRS, and PBCH and synchronisation signals.

FIG. 2 is shows a subframe 200 having two normal Cyclic Prefix (CP) resource blocks 205, 210 and further shows the preferred location of the CQI-RS for multiple layers for multiplexing via Frequency Division Multiplexing. Like FIGS. 1A and 1B, the subframe 200 is shown with a frequency (f) axis and a time (t) axis. The resource blocks 205, 210 are transmission units which are one slot 230, 235 wide in time (t) and twelve subcarriers wide in frequency (f). Each of the slots 230, 235 include seven symbols along the time axis for a normal Cyclic Prefix resource block 205, 210. A number of resource elements make up the resource block 205, 210 including cell-specific reference signals (CRS) 225 together with first LTE-A CQI-RS 240 (layer 1), second LTE-A CQI-RS 245 (layer 1), first LTE-A CQI-RS 250 (layer 2), second LTE-A CQI-RS 255 (for layer 2), first LTE-A CQI-RS 260 (layer 3), second LTE-A CQI-RS 265 (layer 3), first LTE-A CQI-RS 270 (layer 4) and second LTE-A CQI-RS 275 (layer 4).

In FIG. 2, CQI-RS of all layers for LTE-A operation are transmitted in the same OFDM symbol (i.e. symbol number 6) for the case that the layers are multiplexed via FDM. The particular arrangement within the FDM framework is illustrative, other arrangements are possible.

FIG. 3 shows a subframe 300 having two normal Cyclic Prefix (CP) resource blocks 305, 310 and further shows the preferred location of the CQI-RS for multiple layers for multiplexing via hybrid Frequency Division Multiplexing (FDM) and Code Division Multiplexing (CDM). A number of resource elements make up the resource block 305, 310 including cell-specific reference signals (CRS) 325 together with first LTE-A CQI-RS 315 (layer 1 and layer 2), second LTE-A CQI-RS 320 (layer 1 and layer 2), first LTE-A CQI-RS 340 (layer 3 and layer 4) and second LTE-A CQI-RS 345 (layer 3 and layer 4).

In FIG. 3, CQI-RS of all layers for LTE-A operation are transmitted in the same OFDM symbol (i.e. symbol number 6) for the case that the layers are multiplexed hybrid via FDM and CDM. The particular arrangement within the hybrid FDM and CDM framework is illustrative, other arrangements are possible.

FIG. 4 shows a subframe 400 having two normal Cyclic Prefix (CP) resource blocks 405, 410 illustrating the location of the CQI-RS for multiple layers for CoMP cells multiplexed via hybrid FDM and CDM. In operation, the CQI-RS of a layer is transmitted in last OFDM symbol (i.e. OFDM symbol number 6 in the second slot 435), in order to mitigate CQI-RS intercell interference. The intercell interference is further reduced by including a first cell-specific subcarrier offset First $f_{offset}$ and a second cell-specific subcarrier offset Second $f_{offset}$. First $f_{offset}$ determines the Resource Element (RE) location offset of the CQI-RS from the lowest subcarrier index of a resource block for Cell-1. This is shown in FIG. 4 for First $f_{offset}=2$. Second $f_{offset}$ determines the Resource Element (RE) location offset of the CQI-RS from the lowest subcarrier index of a resource block for Cell-2. This is shown in FIG. 4 for Second $f_{offset}=4$. Therefore, LTE-A CQI-RS are as follows: first LTE-A CQI-RS 440 (layer 1 and 2 for cell 1), second LTE-A CQI-RS 445 (layer 1 and 2 for cell 1), first LTE-A CQI-RS 450 (layer 3 and 4 for cell 1), second LTE-A CQI-RS 455 (layer 3 and 4 for cell 1), first LTE-A CQI-RS 460 (layer 1 and 2 for cell 2), second LTE-A CQI-RS 465 (layer 1 and 2 for cell 2), first LTE-A CQI-RS 470 (layer 3 and 4 for cell 2) and second LTE-A CQI-RS 475 (layer 3 and 4 for cell 2).

Advantageously, $f_{offset}$ allows for robust intercell interference management for CoMP CQI-RS transmission.

Transmission Period Configuration of LTE-a Only CQI-RS

FIG. 5 is a schematic diagram of a series of subframes 500 illustrating use of a cell-specific subframe offset SFoffset 510 and the CQI-RS transmission period, $T_{CQI-RS}$ 505. $T_{CQI-RS}$ 505 is the same as the CQI/PMI reporting period for LTE Rel-8, i.e. 2 ms, 5 ms, 10 ms, 20 ms, 40 ms, 80 ms and 160 ms for Frequency Division Duplex (FDD), and 1 ms, 5 ms, 10 ms, 20 ms, 40 ms, 80 ms and 160 ms for Time Division Duplex (TDD). However, $T_{CQI-RS}$ 505 is cell-specific while the CQI/PMI reporting period is UE-specific, hence the configuration of $T_{CQI-RS}$ 505 and CQI/PMI reporting period are independent. In practice, the CQI/PMI reporting period is generally not shorter than $T_{CQI-RS}$ 505.

Higher-layer configured cell-specific subframe offset SFoffset 510 determines the subframe offset for CQI-RS transmission relative to subframe 0 within a frame. SFoffset takes the value from 0 ms to (TCQI-RS−1) ms. FIG. 5 shows a $T_{CQI-RS}$ 505 of 2 ms and SFoffset of 1 ms.

Advantageously, $T_{CQI-RS}$ 505 is useful in controlling the CQI-RS overhead whereas SFoffset 510 is useful for mitigating CQI-RS intercell interference among CoMP cells.

Figure 6:
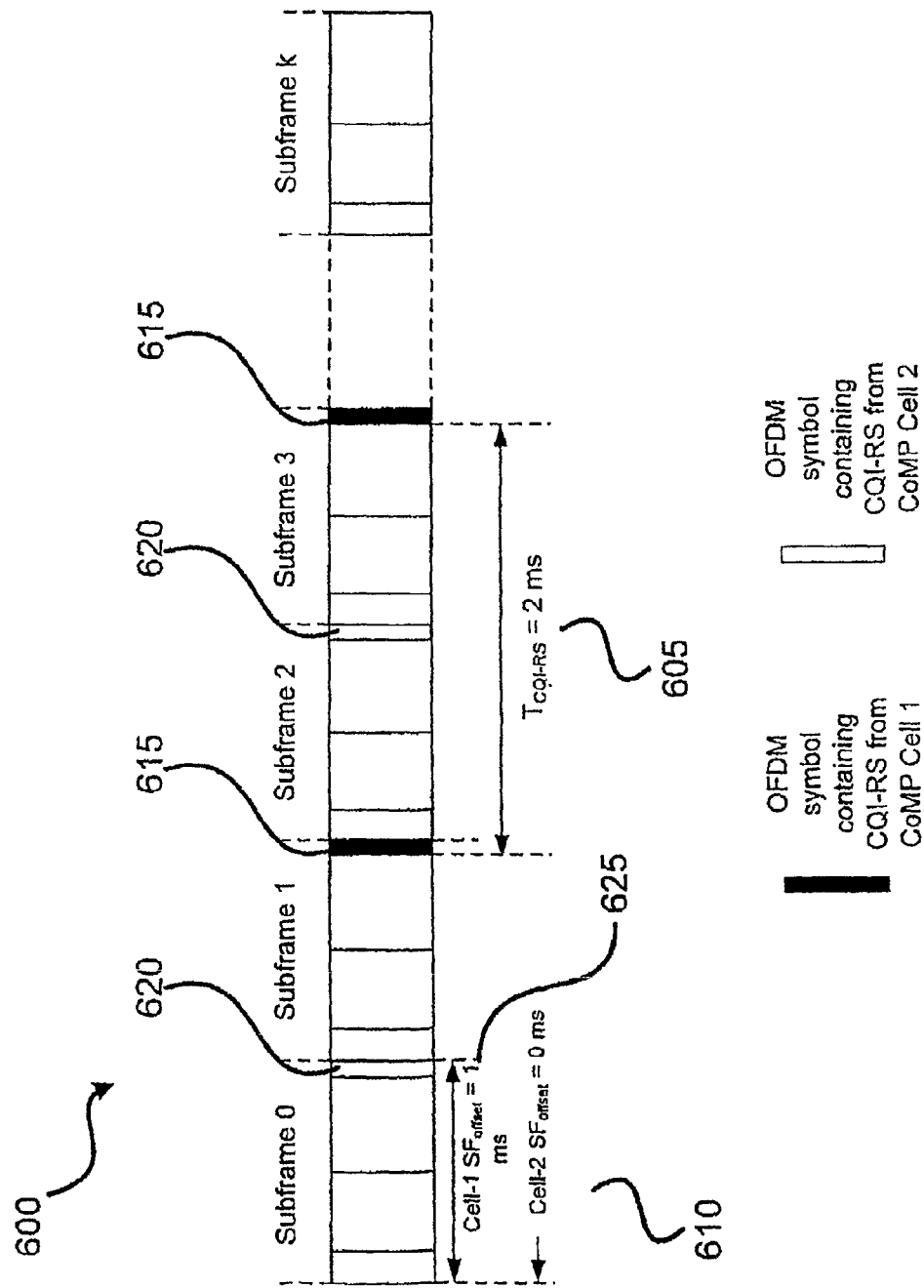
FIG. 6 is a schematic diagram of a series of subframes illustrating use of a cell-specific subframe offset designed for CoMP cells.

FIG. 6 shows a series of subframes 600 and illustrates an example of how SFoffset can be used to avoid CQI-RS of different CoMP cells being transmitted in the same subframe. In this case Cell-1 SFoffset 625 has a value of 1 ms and Cell-2 SFoffset 610 has a value of 0 ms and a $T_{CQI-RS}$ 605 of 2 ms.

Resource Block Allocation for LTE-A Only CQI-RS

The CQI-RS subband which may be denoted k is defined in the similar way as the CQI-reporting subband for LTE Rel-8. The CQI-RS subband size or equivalently the total number of resource blocks that contain CQI-RS is determined based on the system bandwidth for a single component carrier, similar to the CQI-reporting subband size determination for LTE Rel-8. Specifically, the CQI-RS subband size is determined as shown in Table 1.

TABLE 1

CQI-RS Subband Size k vs. System Bandwidth
of a single component carrier

| System Bandwidth of a single component carrier | CQI-RS Subband Size, k |
|---|---|
| 6-7 | Entire system bandwidth |
| 8-10 | 4 |
| 11-26 | 4 |
| 27-63 | 6 |
| 64-110 | 8 |

There is only one resource block in a CQI-RS subband that contains CQI-RS. With this in mind, FIG. 7 shows a schematic diagram of bandwidth (20 Mhz) of subframes 700 (having eight resource blocks in each subband 715) illustrating the use of the resource block offset parameter $RB_{offset}$ 710. Each subband 715 includes a resource block 705 which contains CQI-RS (the subband size=8 resource blocks). The exact location of the resource block that contains CQI-RS is determined by the parameter RBoffset 710. RBoffset ranges from 0 to k−1.

RBoffset 710 can be either configured by a higher-layer or can cycle from the first resource block to the last resource block within the subband as subframe number increments (i.e. round-robin allocation of the CQI-RS to the resource blocks within the subband).

Advantageously, the parameter RBoffset can also be used to mitigate CQI-RS intercell interference among CoMP cells as shown in FIG. 8. In FIG. 8 there shown a Cell-1 RBoffset 820 and a Cell-2 RBoffset 825 within a subband 815. The two offsets are used to avoid CQI-RS of different CoMP cells being transmitted in the same resource block. In case of the round-robin assignment, collision can be avoided by configuring different starting position for different CoMP cell for the round-robin operation.

Advantageously, there is only one resource block in a CQI-RS subband that contains CQI-RS. The total number of resource blocks that contain CQI-RS is determined based on the system bandwidth for a single component carrier. Advantageously, the resource blocks containing CQI-RS are uniformly distributed over the system bandwidth which means it is able to cover the entire system bandwidth (within a component carrier). This is known as the "wideband" requirement in LTE-A. In a further advantage, the arrangement minimises the impact on legacy User Equipment (e.g. LTE Rel-8) by minimising the number of resource blocks that contains CQI-RS within a subband.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

This application is based upon and claims the benefit of priority from Australian provisional patent application No. 2009901196 filed on Mar. 19, 2009 the disclosure of which is incorporated herein in its entirety by reference.

The invention claimed is:

1. An improved channel quality indicator method for determining and transmitting one or more Channel Quality Indicator Reference Signals from one or more subframes such that an associated user equipment can use the one or more Channel Quality Indicator Reference Signals to measure a Channel Quality Indicator, the subframes including first and second slots, each of the first and second slots including a plurality of symbols, and each of the first and second slots forming respectively a first resource block and a following second resource block within each of the one or more subframes, wherein the method comprises:
    generating the one or more Channel Quality Indicator Reference Signals;
    mapping the one or more Channel Quality Indicator-Reference Signals to the last symbol of the second slot of the one or more subframes; and
    transmitting the mapped one or more Channel Quality Indicator Reference Signals from a base station to a user equipment (UE),
    wherein the Channel Quality Indicator Reference Signals transmission avoids collision with a Cell-specific Reference Signal (CRS), a Dedicated Reference Signal (DRS), a Physical Broadcast CHannel (PBCH), or a synchronization signal due to
    i) the Channel Quality Indicator Reference Signal always being conveyed in the last symbol of the second slot of the second resource block conveying the CQI Reference Signal, and
    ii) each of said Cell-specific Reference Signal (CRS), Dedicated Reference Signal (DRS), said Physical Broadcast CHannel (PBCH), and said synchronization signal being located in another OFDM symbol in said second resource block conveying the CQI Reference Signal,
    where the another OFDM symbol of said resource block is a different symbol from the last OFDM symbol in the second slot of said second resource block such that the Channel Quality Indicator Reference Signal transmission and said Cell-specific Reference Signal (CRS), Dedicated Reference Signal (DRS), said Physical Broadcast CHannel (PBCH), and said synchronization signal are always located in different OFDM symbols in the same resource block that conveys the Channel Quality Indicator Reference Signal.

2. The improved channel quality indicator method according to claim 1, comprising, before said mapping, providing one or more subcarrier frequency offsets for the Channel Quality Indicator Reference Signals from the lowest subcarrier index in a resource block.

3. The improved channel quality indicator method according to claim 2, wherein the subcarrier frequency offset is an integer in the range of 0 to 5.

4. The improved channel quality indicator method according to claim 1, wherein two of the Channel Quality Indicator Reference Signals are included within the second resource block, the two Channel Quality Indicator Reference Signals being located in different sub-carriers associated with the second resource block.

5. The improved channel quality indicator method according to claim 4, wherein the two Channel Quality Indicator Reference Signals are uniformly distributed over the sub-carriers associated with the second resource block.

6. The improved channel quality indicator method according to claim 1,
    wherein a Coordinated Multi-Point cell is transmitted in the same second resource block as the one or more Channel Quality Indicator Reference Signals, and
    said method further comprising, before said mapping, providing a first subcarrier frequency offset for a first Coordinated Multi-Point cell and a second subcarrier frequency offset for a further Coordinated Multi-Point cell.

7. The improved channel quality indicator method according to claim 1, further comprising providing the Channel Quality Indicator Reference Signals with a transmission period, $T_{CQI\text{-}RS}$.

8. The improved channel quality indicator method according to claim 7, wherein $T_{CQI\text{-}RS}$ is equal to a CQI/PMI reporting period.

9. The improved channel quality indicator method according to claim 8, wherein the CQI/PMI reporting period is any of 2 ms, 5 ms, 10 ms, 20 ms, 40 ms, 80 ms and 160 ms for Frequency Division Duplex.

10. The improved channel quality indicator method according to claim 8, wherein the CQI/PMI reporting period is any of 1 ms, 5 ms, 10 ms, 20 ms, 40 ms, 80 ms and 160 ms for Time Division Duplex.

11. The improved channel quality indicator method according to claim 1, further comprising providing a subframe offset for higher-layers wherein a subframe offset for the Channel Quality Indicator Reference Signals transmission is relative to subframe 0 within a frame.

12. The improved channel quality indicator method according to claim 11, wherein said subframe offset takes the value from 0 ms to $(T_{CQI\text{-}RS}-1)$ ms.

13. The improved channel quality indicator method according to claim 1, further comprising:
determining the total number of the second resource blocks that contain the Channel Quality Indicator Reference Signals based on the system bandwidth for a single component carrier, wherein the location of the resource block that contains the Channel Quality Indicator Reference Signals is determined by a parameter $RB_{offset}$.

14. The improved channel quality indicator method according to claim 13, wherein $RB_{offset}$ ranges from 0 to k−1, where k is a Channel Quality Indicator Reference Signals subband size.

15. The improved channel quality indicator method according to claim 14, wherein $RB_{offset}$ is configured by a higher-layer.

16. The improved channel quality indicator method according to claim 14, wherein $RB_{offset}$ is configured by cycling from the first resource block to the last resource block within a Channel Quality Indicator Reference Signal subband as subframe number increments.

17. The improved channel quality indicator method according to claim 1, wherein the Channel Quality Indicator Reference Signals transmission avoids collision with a Cell-specific Reference Signal (CRS).

18. The improved channel quality indicator method according to claim 1, wherein the Channel Quality Indicator Reference Signals transmission avoids collision with a Dedicated Reference Signal (DRS).

19. The improved channel quality indicator method according to claim 1, wherein the Channel Quality Indicator Reference Signals transmission avoids collision with a Physical Broadcast CHannel (PBCH).

20. The improved channel quality indicator method according to claim 1, wherein the Channel Quality Indicator Reference Signals transmission avoids collision with said Cell-specific Reference Signal (CRS), Dedicated Reference Signal (DRS), said Physical Broadcast CHannel (PBCH), and said synchronization signal.

* * * * *